Sept. 7, 1937.  B. M. GUTHRIE  2,092,248
MATERIAL CONVEYING DEVICE
Filed June 6, 1935  2 Sheets-Sheet 1
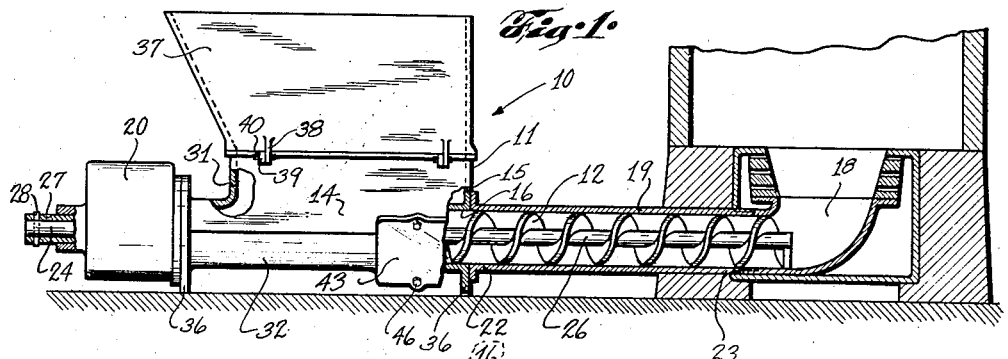
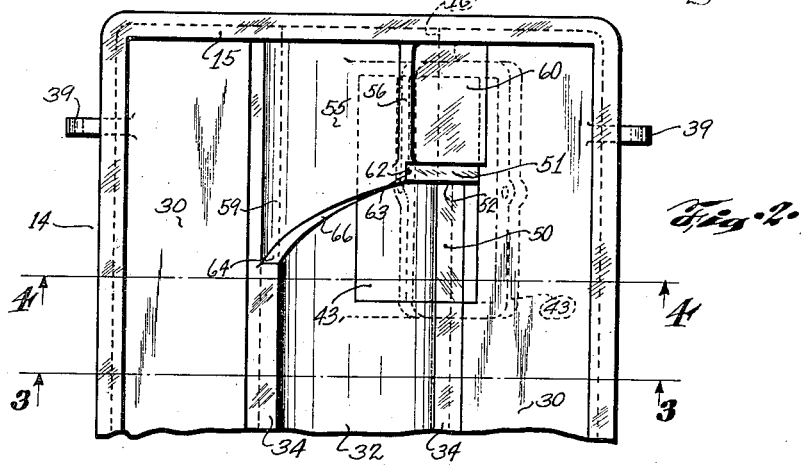
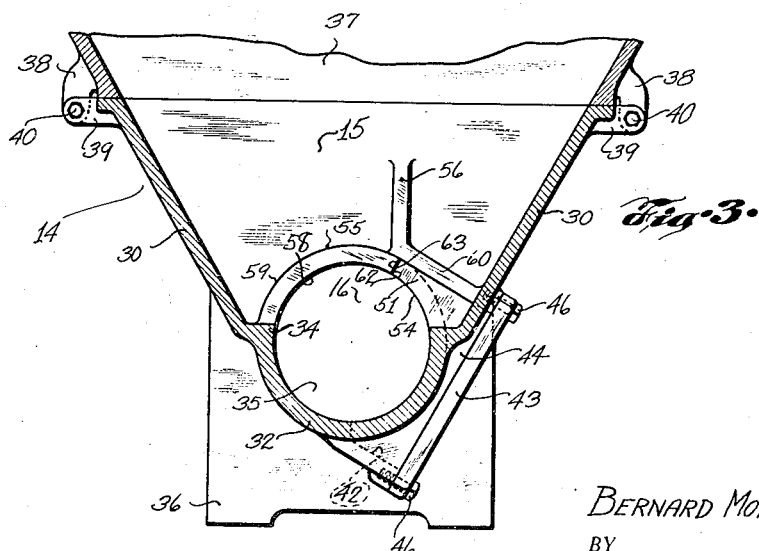
INVENTOR.
BERNARD MORSE GUTHRIE
BY
ATTORNEY.

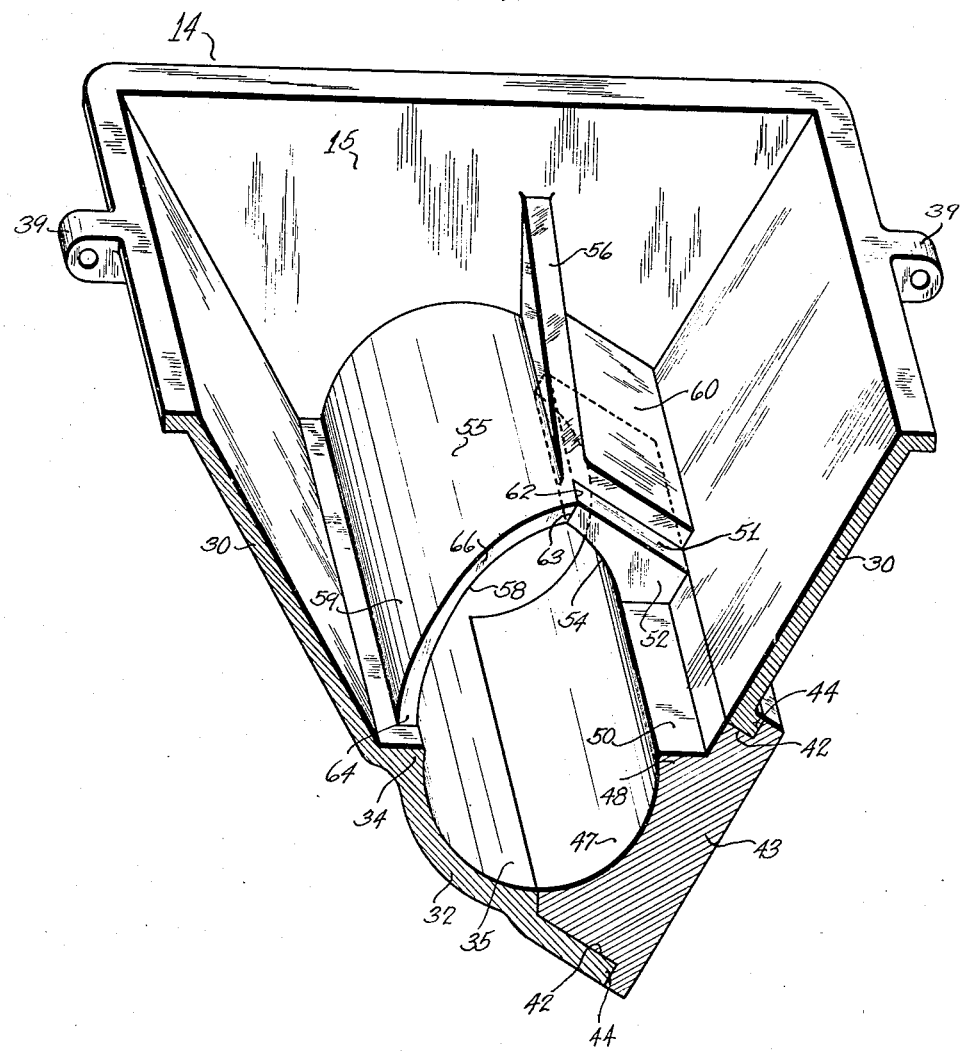

Patented Sept. 7, 1937

2,092,248

UNITED STATES PATENT OFFICE 2,092,248

MATERIAL CONVEYING DEVICE

Bernard Morse Guthrie, Chicago, Ill., assignor to Fairbanks, Morse & Co., Chicago, Ill., a corporation of Illinois Application June 6, 1935, Serial No. 25,235

12 Claims. (Cl. 198—64)

This invention relates to improvements in material conveying devices and more particularly to improvements in the devices for delivering solid fuel to mechanical stokers of screw conveyor type.

In the operation of many of the older prevailing stoker assemblies, coal or other solid fuel is delivered to the hopper, whence it is carried by means of a screw conveyor, to the furnace grate or retort. The conveyor may be operated by an electric motor, or other suitable power machine which, in many instances, is mounted on the hopper frame. As is well known, the ordinary run of fuel delivered to the hopper may contain deleterious matter such as pieces of scrap iron, spikes or rocks which cannot be crushed or passed through the hopper discharge opening by the screw conveyor. In the event of such foreign material being conveyed to the hopper discharge opening, the screw will become jammed, and as a result, serious damage may be done to the driving motor and screw, and possibly to portions of the hopper structure about the discharge opening. To prevent such damage to the stoker parts, it is common practice to provide a readily replaceable shear element in the drive connection between the motor and the screw shaft, the shear element serving to sever the drive connection in the event of such jamming, or in case any excessive strain is placed on the operation of the motor or conveyor screw. In these older prevailing stoker assemblies, whenever jamming of the screw conveyor occurs as a result of spikes or other foreign matter, it becomes necessary, in order to remove the obstruction, to take out by hand or otherwise, the greater portion, if not all, of the fuel in the hopper. As will be readily understood, such a procedure necessarily involves an expenditure of considerable time and labor. In many instances, a complete shutdown of the furnace is necessary in order to remove the obstruction and to restore the stoker to a condition for further operation.

A further disadvantageous feature of the stoker assemblies heretofore employed is found in the tendency of obstructions to become jammed between a peripheral portion of the screw conveyor and wall portions of the hopper discharge opening. In such a case, the screw member and the wall portions of the hopper adjacent the discharge opening, may be damaged prior to the shearing of the safety element in the drive connection to the screw conveyor. If the damage is considerable, it may be found necessary to repair or replace the damaged parts before the stoker may be again placed in operation, thereby causing delay and inconvenience.

It is, therefore, an object of the present invention to provide in a stoker assembly, novel means for permitting a quick and ready removal of obstructing material from the hopper, with but a minimum of time and labor expenditure, and which will obviate the noted difficulties with older prevailing forms of stoker assemblies. The novel means presently to be described and claimed, also provide an additional feature which is adapted to prevent possible damage to the hopper and screw conveyor members which, in the older constructions, occurred immediately prior to the shearing of the safety shear element in the driving connections.

Another object may be found in the provision of an improved hopper assembly so formed as to provide a separate chamber or channel in the base portion thereof, for receiving the conveyor screw, the channel being formed in such manner as effectively to prevent wedging or jamming of the fuel material and such deleterious matter as it may contain, between the screw and wall portions of the hopper base, only enough material being admitted to the channeled portion of the hopper base as will fill each flight of the screw conveyor.

A further object may be found in the provision, in a stoker assembly, of a clean-out opening disposed in a wall portion of the hopper base and communicating with a conveyor screw channel formed in the bottom portion of the base, and a removable closure or cover plate for this opening, which is disposed adjacent the hopper discharge opening, whereby ready access may be had to the screw channel for removing obstructing material unable to be passed through the discharge opening without damage.

A still further object is to provide, in a stoker assembly, a removable closure for a clean-out opening in the hopper base, and which is formed to provide an abutment for obstructing objects, the abutment being so disposed with respect to the conveyor, as to receive thereagainst the obstructing objects, and to retain them against possible damage to the adjacent hopper wall portions.

Yet another object may be found in the provision, in an improved stoker assembly including a hopper having a hollow base, of a clean-out opening and closure conveniently located in a wall portion of the base, beyond the fuel conduit, so that the hopper assembly may be mounted relatively close to the furnace in order to conserve space, or in case of a limited space being available for its mounting.

Further objects and advantages will be found from the following description, and from the accompanying drawings in which:

Fig. 1 is an assembly elevation, partly in section, of one form of stoker assembly embodying the improvements of the present invention; Fig. 2 is an enlarged fragmentary plan view of the base of the hopper assembly; Fig. 3 is a transverse section, partly in elevation, of the hopper base, as viewed from line 3—3 in Fig. 2, and Fig. 4 is a view in perspective of a section of the hopper base, the section being taken along line 4—4 in Fig. 2.

Referring now to the drawings by suitable characters of reference, the numeral 10 designates, generally, a preferred form of stoker assembly embodying the improvements of the present invention, and including a hopper structure generally designated by the numeral 11, a screw type conveyor 12 operatively disposed in the base portion 14 of the hopper and extended outwardly of one end 15 thereof, through the hopper discharge opening or port 16 to a furnace grate or retort 18, the extended portion of the conveyor being enclosed in a delivery casing or conduit 19, and operating means for the screw conveyor, designated generally at 20, and which may conveniently consist of an electric motor and suitable gearing. The end 22 of the casing 19 is secured in any suitable manner, to the wall 15 of the hopper base in concentric relation to the discharge opening 16 therein, and the opposite end 23 of the tube engages the furnace retort 18. The driving connection to the conveyor screw 12 is, by preference, made through an extension 24 of the screw shaft 26, a sleeve 27 operatively connected to the motor 20, and a removable shear pin element 28, preferably disposed transversely through the sleeve 27 and shaft extension 24 and forming an easily accessible operative connection therebetween. The pin 28 is of such material as will readily shear in the event of an excessive strain upon the conveyor screw, such as may result from undue packing of the fuel material along the conveyor screw, or from obstructing material such as spikes, rocks, etc. The provision of shear pin 28 is conventional, and hence forms, of itself, no part of the present invention.

Referring with greater particularity to Figs. 2 and 3, a novel feature of the present invention is to be found in the presently preferred form of the hopper base 14 which, as clearly appears in Fig. 3, is substantially V-shape in cross section. The base 14 comprises inclined side walls 30, end walls 15 and 31, and a semi-cylindrical bottom wall 32. The end wall 15 is provided, as hereinbefore described, with the hopper discharge opening 16. A shoulder 34, extending longitudinally and inwardly of the hollow base, is provided, by preference, at the juncture of each side wall 30 with the bottom wall 32, to form with the wall 32, a substantially semi-cylindrical channel 35 in the bottom portion of the base, for the reception of the screw conveyor 12. The channel is formed in such manner as to provide a minimum of clearance between the screw conveyor and the channel wall 32. It will be observed from the showing of Fig. 3, that the shoulders 34 extend the bottom wall 32 upwardly beyond a horizontal plane of the axis of the conveyor channel 35, thus tending to prevent jamming of the fuel as well as foreign material between the screw and the channel wall 32. The effect of such extension of the channel wall is to confine the delivery of fuel to the several flights of the conveyor, to a substantially vertical direction of feed, only enough material being admitted to the conveyor as will fill each of the several screw flights.

As a means for supporting the hopper structure, the base 14 is shown as provided with foot members 36 which, for convenience, may be formed as integral parts of the base structure. The upper portion of the hopper structure, which is designated by the numeral 37, is adapted to engage and seat upon the upper portion of the base, as by companion flanges in the manner substantially illustrated in Figs. 1 and 3. The structure 37 and the walls 30 of the hopper base are provided, respectively, with paired assembly lugs 38 and 39 which may be secured together in any suitable manner, as by the assembly bolts 40.

The principal feature of the present invention is to be found in the provision, either alone or in combination with an improved stoker organization, of a particularly novel means for facilitating removal of obstructing matter from within the hopper base, without necessitating removal of all or a substantial portion of the fuel material from the hopper, as is generally required in the prevailing stokers heretofore employed. In the presently preferred example, the hopper base 14 is provided with a clean-out opening 42 in a side portion of the channel wall 32 and a portion of the adjacent wall 30, just inwardly of the end wall 15 (Fig. 4), for providing a ready access to the portion of the conveyor channel 35 adjacent the hopper discharge opening 16. During operation of the stoker, the opening 42 is normally closed by a cap or closure 43. The wall portions about the openings 42 are, by preference, bossed as at 44, to provide a seat for the closure, to which the closure may be removably secured, as by the assembly bolts or cap screws 46. If desired, a suitable gasket (not shown) may be provided between the closure and the seat 44.

The inner wall surface 47 of the closure member 43 conforms substantially to the curvature of the channel wall 32 and serves to complete the channel wall across the base opening 42, when the closure is assembled to the hopper base. Also, a portion of the upper longitudinal end 48 of the closure is, by preference, formed to provide a shoulder 50, which, in the assembly of the closure to the base, forms a continuation of the adjacent channel shoulder 34. The closure is, by preference, provided, in addition, with an inwardly and upwardly extending member or lug 51, formed inwardly of the shouldered end portion 48, and extending over a portion of the length thereof, as shown in Figs. 2 and 4. The lug end 52 adjacent the shoulder 50 forms an abutment for a purpose presently to be described. By preference, the inner surface 54 of the lug conforms to the curvature of the closure surface 47 and forms a continuation thereof. As will appear from Figs. 3 and 4, the inner edge of surface 52, and the inner edge of shoulder 50, will serve respectively as transverse and longitudinal shearing edges, due to their proximity to the periphery of the screw.

Overlying the channel 35 and a portion of the lug 51, is a curved wall structure 55 extending longitudinally of the base and inwardly from the base end wall 15. The wall 55 may be formed integrally with the hopper base, and may be strengthened in its support by the web 56. As may be observed from Figs. 3 and 4, the inner surface 58 of the portion 59 of wall 55 preferably conforms to the curvature of the channel wall 32, with the result that the wall portion 59 cooperates with lug 51, closure 43 and channel wall 32, to define a cylindrical bore adjacent to and extending somewhat inwardly of the hopper discharge opening 16. This bore constitutes a tubular extension of the conduit 19, inwardly of the hopper. The portion 60 of the wall structure 55 overlying the lug 51 is, by preference, upwardly offset from the curved wall portion 59, whereby to provide the upper end portion 62 of wall portion 59 as an abutment for the free end 63 of lug 51, in the manner illustrated in Figs. 3 and 4. As will be noted from Figs. 2 and 4, the base portion 64 of wall 59 extends inwardly from the hopper wall 15, substantially beyond the free end of the upper portion 62, whereby the curved end 66 of wall 59 may be formed as a relatively steep ramp or incline to serve as a guide or camming surface for purposes presently to appear, it being noted that this element is sloped in a direction opposite to the pitch of the screw, but in the direction of fuel feed through the hopper channel 35.

The hopper base 14 and wall structure 59 may be formed of cast iron or other suitable material and are preferably cast as a single unit. Only a minimum of machining operations are required to adapt it for assembly in the stoker structure.

In the operation of the stoker mechanism, if during the movement of the conveyor screw in feeding fuel along the channel 35 in the hopper base 14 and through the conduit 19 to the furnace retort 18, a foreign infrangible object such as a spike should engage the flights of the conveyor screw, it will be conducted toward the hopper discharge opening 16 until it strikes the camming end surface 66 of wall 59. Continued operation of the screw will cause the spike or other infrangible foreign element to travel along the inclined camming surface 66 into abutting engagement with the end 52 of closure lug 51. At this point the foreign object may be brought to rest in the pocket defined by the horizontal surface 50, the adjacent lateral surface of portion 48, and the vertical transverse surface 52, and so remain clear of the screw. Failing this, the spike or other obstruction will be jammed against the shoulder 50 and the lug end 52 on the closure, resulting in a shearing of the shaft pin 28 to stop the operation of the screw conveyor and prevent damage thereto.

It will be understood that not all hard foreign particles will be directed toward and jammed against the lug 51 of the closure member 43, but only foreign matter of such size as cannot be delivered through the passage formed by the wall structure 55 and leading to the hopper discharge opening 16, or which is of such hardness that it cannot be broken up by the operation of the screw conveyor. If the foreign object is not of unusual hardness, the inner edges of faces 66 and 52 will coact in shearing or crushing the particle to a size to be handled by the screw.

When the conveyor screw becomes jammed by the deposit of obstructing material against the shoulder 50 and lug 51, the jam may be relieved and the screw cleared for further operation simply by removing the closure 43, which will permit the obstructing matter to fall out by gravity, or if the object has become wedged in the fuel packed against it by the operation of the screw immediately prior to the shearing of pin 28, then the operator may remove the material manually, through the clean-out opening 42. Reassembling the closure 43 to the hopper base 14 and replacing the sheared pin 28, once more places the stoker mechanism in operative condition.

It will be noted that by directing obstructing matter to bear against the shoulder 50 and lug 51 of closure 43, the jamming pressure or strain is transmitted in greater part to the closure cap screws 46, thereby relieving the rest of the hopper structure, and particularly the conveyor screw, from any appreciable strain.

The presently described improved hopper structure fully attains the several foregoing objects, and in addition provides a compact hopper and screw conveyor structure which may be maintained in operative condition with a minimum expenditure of time and labor.

It is to be understood that the present description relates to the presently preferred embodiment of the invention as illustrated in the drawings, and that the invention is not limited to such preferred embodiment, but that alterations and modifications may be made therein without departing from the spirit and full intended scope of the invention, as defined by the appended claims.

I claim:

1. A hopper structure for a stoker assembly, comprising a fuel receiving hopper, a fuel conveyor screw operable in said hopper, a removable element having an abutment extending within said hopper in overlying relation to said conveyor, said abutment and portions of the removable element cooperating to form a pocket for the entrapment of foreign solids, and means in said hopper forming a guide surface sloped in a direction opposite to the pitch of the screw and extending into engagement with said abutment.

2. A hopper structure for a stoker assembly, comprising a fuel receiving hopper, a fuel conveyor operable in said hopper, means removably disposed in a side portion of said hopper, adapted to permit removal from the hopper of deleterious matter in the fuel, and means disposed within the hopper adapted to direct such deleterious matter toward said first means, said last means including an abutment on said first means and a guide element in said hopper forming a continuation of said abutment.

3. A hopper structure for a stoker assembly, comprising a hollow base, a fuel conveyor operable in said base, and means removably disposed through a side portion of said base and overlying a portion of said conveyor, adapted to collect infrangible solids occurring with the fuel delivered to said conveyor, and an element in said base abutting a portion of said removable means, adapted to direct such infrangible solids toward said means.

4. A hopper structure for a stoker assembly, comprising a hollow base having a fuel discharge opening in one end thereof, a screw conveyor operably disposed in said base and having a portion extending through said discharge opening, the base further being provided with a clean-out opening in a side portion providing access to the interior thereof for the removal of foreign solids carried by the fuel, a removable closure for said clean-out opening, an extension carried by the closure and directed inwardly of the hollow base, and means in said base cooperating with said extension, for directing the foreign solids toward said cleanout opening, said extension and portions of the closure coacting to form a pocket for the entrapment of said foreign solids.

5. In a hopper for use with a conveyor for solid fuel, a fuel-conveying screw in the lower portion of the hopper, the hopper being provided with an opening through which fuel from the interior of the hopper is fed to the screw, a clean-out opening in a wall portion of the hopper, substantially underlying the conveyor screw, a closure for said opening, an abutment on said closure directed interiorly of the hopper and peripherally of the screw, and means forming a camming surface sloped in a direction opposite to the pitch of the screw and merging with said abutment.

6. In a hopper for use with a conveyor for solid fuel, a fuel-conveying screw operable in the lower portion of the hopper, a screw channel of partly circular transverse section and of longitudinal trend, the walls of said channel extending upwardly beyond a horizontal axial plane through the screw and channel, the channel wall being shouldered on one of its upper margins, means forming an abutment generally transverse to and overlying the screw and channel interiorly of the hopper, and means in said base extending from said wall shoulder and merging with said abutment, for directing foreign solids toward said abutment.

7. In a device for feeding and conveying solid fuel, a hopper having a delivery port at one end, a delivery conduit connected to the hopper beyond said port, a screw conveyor operable in said conduit and the lower portion of said hopper, a clean-out opening in a side wall of the hopper, adjacently to and inwardly of said delivery port, a closure therefor, and an abutment carried by the closure and overlying the screw transversely to its axis, said abutment and portions of the closure coacting to form a pocket peripherally of the screw for the entrapment of infrangible material carried by the fuel.

8. In a device for feeding and conveying solid fuel, a fuel hopper, a delivery conduit connected to the hopper, a screw conveyor operable in said conduit and lower portion of said hopper, an abutment extending laterally and inwardly of a side wall of the hopper and peripherally overlying the screw transversely to its axis, the abutment being provided with a shearing edge for frangible material, a camming element forming a continuation of said abutment and peripherally overlying the screw, and sloped to direct any foreign solid carried by the fuel, toward said abutment, the hopper being formed to provide a pocket in the region of said abutment, for the retention of entrapped solids, and the lower hopper wall including a removable wall element providing access, from without the lower portion of the hopper, to the pocket and space interiorly of the hopper normally adjacent said abutment.

9. In a hopper structure for feeding solid fuel, a hopper having a delivery port at one end, adapted for connection to a delivery conduit external to the hopper, a screw conveyor operable in the lower portion of said hopper, a tubular housing within the hopper adjacent said delivery port and surrounding a portion of the screw, an inner end portion of the housing constituting an abutment overlying the screw transversely thereto and another portion of the inner end of the housing being sloped to constitute a camming surface approaching said abutment, and a removable wall element in the lower portion of the hopper providing access to the space interiorly thereof and adjacent the abutment.

10. In combination with a stoker assembly, a hopper structure including a base, a channel formed in and extending longitudinally of the base, the base being provided at one end with a fuel discharge opening in communication with said channel, a screw conveyor operable in said channel and having a portion thereof extending through said discharge opening, the base being provided with a clean-out opening in a side wall thereof and in communication with the portion of the channel adjacent the discharge opening, a removable closure for said clean-out opening, means associated with the closure for the entrapment of foreign solids occurring with the fuel, and means in said base and overlying a portion of the screw conveyor, adapted for directing foreign solids toward said entrapment means.

11. In a device for feeding and conveying solid fuel, a hopper having a delivery port at one end adapted for connection to a delivery conduit beyond the hopper, a screw conveyor operable in the lower portion of the hopper, a tubular housing for the conveyor, within the hopper, an abutment formed by an inner edge of the tubular portion and provided with a transverse shearing edge, a camming surface constituted by a different portion of the inner extremity of the housing and adapted to direct infrangible material toward said abutment, a shoulder extended along the screw inwardly of the tubular housing and formed to provide a longitudinal shearing edge peripherally adjacent the screw, said shoulder and abutment coacting to form a pocket for infrangible substances adjacent the inner edge of the tubular portion, and a removable wall element constituting a closure for the lower portion of the hopper and for a portion of the tubular housing, said shoulder and abutment being carried by the removable wall element.

12. In combination with a stoker assembly, a hopper structure including a hollow base, a channel extending longitudinally of the bottom portion of the base, the base having a fuel discharge opening in one end thereof in communication with said channel, a screw conveyor operable in said channel and having a portion thereof extending through said discharge opening, means for driving said conveyor, said means including a separable connection adapted to open upon the application of an excessive load to the conveyor, the base having a clean-out opening in one of its side walls adjacent said discharge opening and in communication with said channel, a removable closure for said clean-out opening, a projection on said closure, extending inwardly of the hollow base in overlying relation to a portion of said conveyor, and means in said base and overlying a portion of the conveyor and said projection, adapted for directing foreign solids carried by the fuel, toward said projection.

BERNARD MORSE GUTHRIE.